(12) United States Patent
Kubota et al.

(10) Patent No.: US 11,235,807 B2
(45) Date of Patent: Feb. 1, 2022

(54) REAR VEHICLE-BODY STRUCTURE OF VEHICLE

(71) Applicant: MAZDA MOTOR CORPORATION, Hiroshima (JP)

(72) Inventors: Harumitsu Kubota, Hiroshima (JP); Taichi Hirakawa, Hiroshima (JP); Nobuyuki Nakayama, Aki-gun (JP); Yasunori Isshiki, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 157 days.

(21) Appl. No.: 16/821,736

(22) Filed: Mar. 17, 2020

(65) Prior Publication Data

US 2020/0385058 A1  Dec. 10, 2020

(30) Foreign Application Priority Data

Jun. 7, 2019 (JP) .............................. JP2019-107387

(51) Int. Cl.
| | |
|---|---|
| *B62D 21/15* | (2006.01) |
| *B60R 19/24* | (2006.01) |
| *B62D 21/02* | (2006.01) |
| *B62D 25/20* | (2006.01) |
| *B62D 25/16* | (2006.01) |

(52) U.S. Cl.
CPC ............ *B62D 21/152* (2013.01); *B60R 19/24* (2013.01); *B62D 21/02* (2013.01); *B62D 25/2027* (2013.01); *B62D 25/16* (2013.01)

(58) Field of Classification Search
CPC .. B62D 21/152; B62D 21/02; B62D 25/2027; B62D 25/16; B60R 19/24
See application file for complete search history.

(56) References Cited

U.S. PATENT DOCUMENTS

| | | | | |
|---|---|---|---|---|
| 4,702,515 A | * | 10/1987 | Kato ................... | B62D 21/152 188/377 |
| 2009/0026802 A1 | * | 1/2009 | Imada ................. | B62D 21/152 296/187.11 |

FOREIGN PATENT DOCUMENTS

| | | | | |
|---|---|---|---|---|
| JP | 2839658 B2 | * | 12/1998 | ........... B62D 21/152 |
| JP | 2008080925 A | | 4/2008 | |
| JP | 2015041350 A | * | 3/2015 | |
| JP | 2016002964 A | * | 1/2016 | ............. B62D 25/08 |
| JP | 2018090020 A | * | 6/2018 | ........... B62D 21/157 |

* cited by examiner

*Primary Examiner* — Lori L Lyjak
(74) *Attorney, Agent, or Firm* — Studebaker & Brackett PC

(57) ABSTRACT

A rear vehicle-body structure of a vehicle can enhance the performance of protecting a vehicle component disposed under a rear floor against a rear-end collision load. The rear vehicle-body structure of a vehicle includes a rear bumper reinforcement having a rear bumper beam extending in a vehicle width direction along a rear bumper and load absorbing parts extending from left and right ends of the rear bumper beam toward a vehicle front side, and rear side frames extending in a vehicle front-rear direction respectively along left and right side portions of a rear floor and coupled at rear ends to front ends of the load absorbing parts, with a vehicle component being disposed under the rear floor. A vertical center of the rear bumper beam is located lower than a respective vertical center of each of the rear side frames.

20 Claims, 6 Drawing Sheets

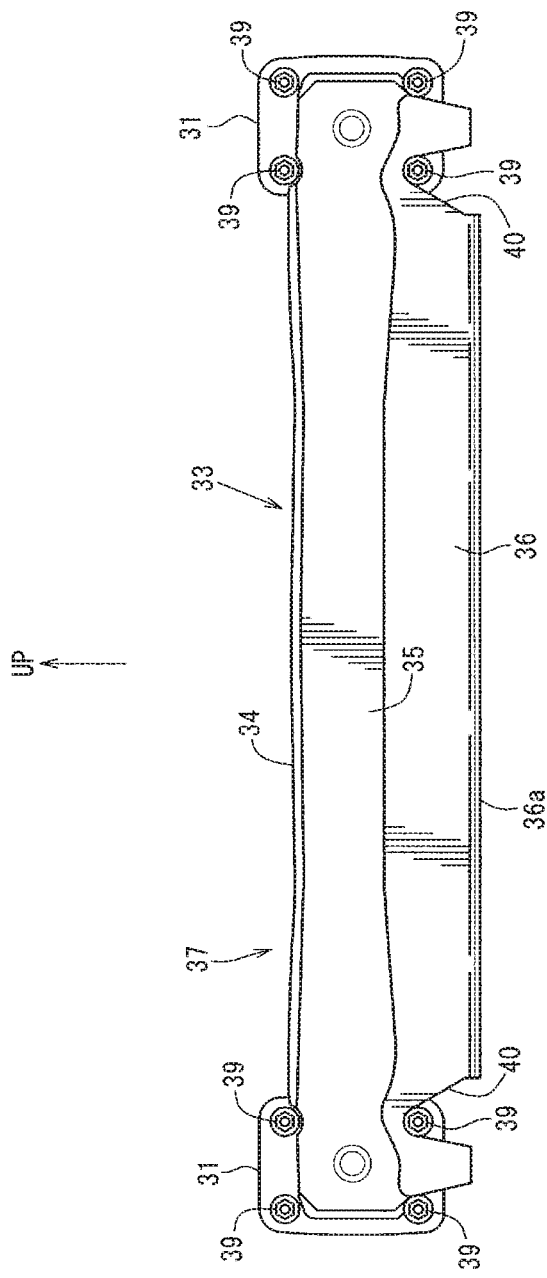

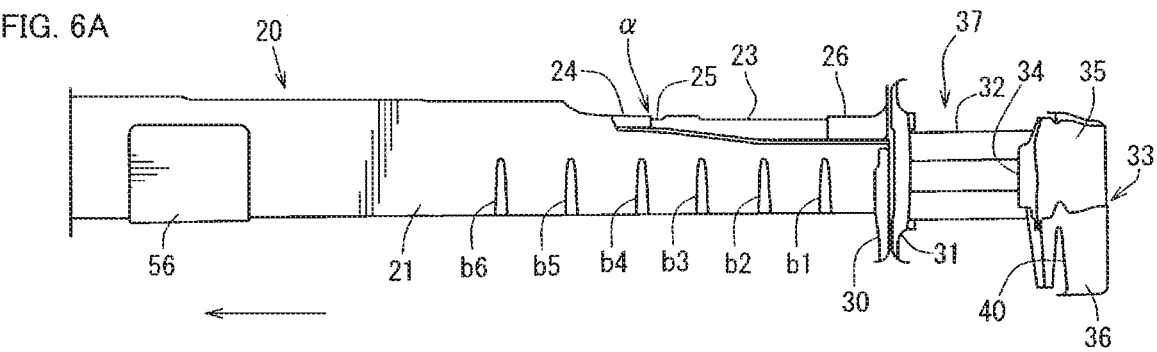
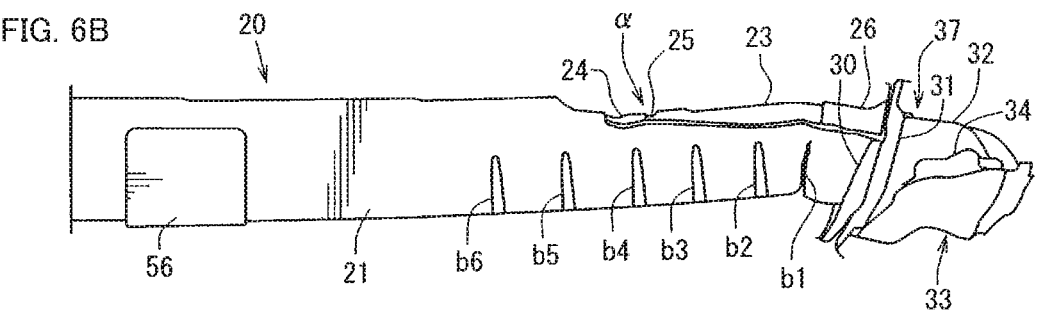
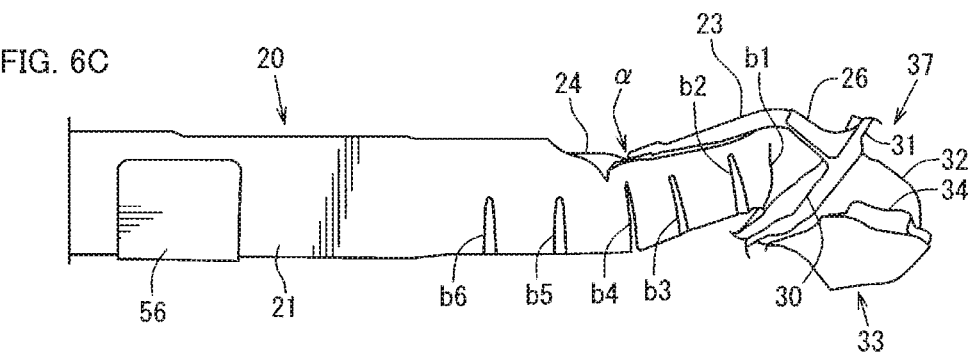
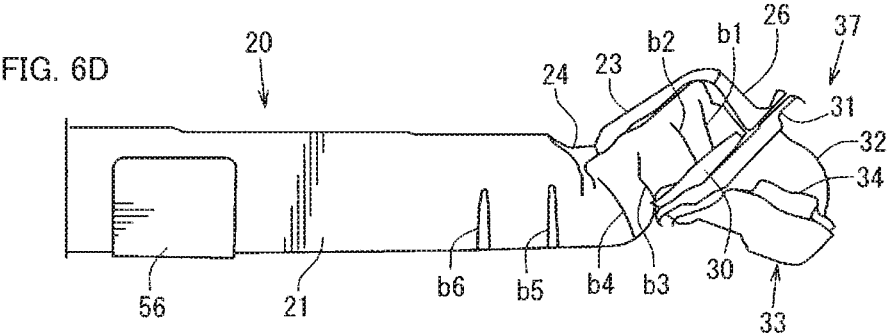

REAR VEHICLE-BODY STRUCTURE OF VEHICLE

BACKGROUND

Technical Field

The present disclosure relates to a rear vehicle-body structure of a vehicle, more particularly to a rear vehicle-body structure of a vehicle including a rear bumper reinforcement having a rear bumper beam extending in a vehicle width direction along a rear bumper and load absorbing parts extending from left and right ends of the rear bumper beam toward a vehicle front side, and rear side frames extending in a vehicle front-rear direction respectively along left and right side portions of a rear floor and coupled at rear ends to front ends of the load absorbing parts, a vehicle component being disposed under the rear floor.

Background Art

Typically, vehicles such as sport utility vehicles (SUVs) are tall and have rear side frames and a rear bumper beam installed at high levels. Other vehicles, for example, EVs (electric vehicles that drive wheels by a motor supplied with electricity from a battery unit) are assumed to have a battery unit disposed under a front floor panel and a kick-up, while range-extended electric vehicles (so-called REEVs that include a wheel driving motor, a battery unit that supplies the motor with electricity, and an engine that drives a generator, and supply electricity generated by the generator to a battery to charge the battery) are assumed to have a fuel tank disposed further rearward of the battery unit.

It is desirable to protect the battery unit and the fuel tank against a rear-end collision load. The problem is that the battery unit and the fuel tank are disposed at positions far below the rear side frames, which makes it difficult to protect these vehicle components (the battery unit and the fuel tank) by the rear bumper beam.

Japanese Patent Laid-Open No. 2008-80925 discloses an automobile bumper structure in which the vertical center of a rear bumper beam is located on a vehicle upper side relative to the vertical center of the rear side frame. Since the vertical center of the rear bumper beam is thus located above the vertical center of the rear side frame, it is difficult to protect a vehicle component of a tall vehicle in a rear-end collision, which remains to be improved.

Therefore, the present disclosure provides a rear vehicle-body structure of a vehicle that can enhance the performance of protecting a vehicle component disposed under a rear floor against a rear-end collision load.

SUMMARY

A rear vehicle-body structure of a vehicle of the present disclosure includes a rear bumper reinforcement having a rear bumper beam extending in a vehicle width direction along a rear bumper and load absorbing parts extending from left and right ends of the rear bumper beam toward a vehicle front side, and rear side frames extending in a vehicle front-rear direction respectively along left and right side portions of a rear floor and coupled at rear ends to front ends of the load absorbing parts. Also, a vehicle component is disposed under the rear floor. In this structure, the vertical center of the rear bumper beam is located lower than the respective vertical center of each of the rear side frames. The vehicle component may be set as a battery unit of an electric vehicle or as a fuel tank of a range-extended electric vehicle.

In this configuration, the vertical center of the rear bumper beam is located lower than the vertical center of the rear side frame, so that a rear-end collision load can be temporarily received by the rear bumper beam even in a tall vehicle. Thus, the performance of protecting the vehicle component disposed under the rear floor against a rear-end collision load can be enhanced.

In one embodiment of the present disclosure, the proof stress of the rear side frame in an axial direction is set to be lower at a rear-side part than at a front-side part. In a rear-end collision, this configuration can absorb the load (energy) as the rear side frame bends at a rear end of the rear-side part having lower axial proof stress and then a part of the rear side frame on the front side from the rear end is axially compressed.

In one embodiment of the present disclosure, a fragile portion relative to a load applied in a front-rear direction is formed on an upper side of a border between a front-side part and a rear-side part of the rear side frame. In a rear-end collision, this configuration can absorb the load as the rear side frame bends at the fragile portion provided on the upper side of the border and then a part of the rear side frame on the front side from the fragile portion is axially compressed.

In one embodiment of the present disclosure, a fragile portion relative to a load applied in a front-rear direction is formed on a lower side of a rear end portion of the rear side frame. In this configuration, the fragile portion is formed on the lower side of the rear end portion. This fragile portion acts as a breakage starter and can facilitate breakage in a rear-end collision.

In one embodiment of the present disclosure, a bracket to which a setting plate is coupled is provided on an upper side of a rear end of a rear-side part of the rear side frame, and the rear end of the rear-side part and a front end of the bracket are different in rigidity from each other.

In this configuration, the supporting rigidity of the rear bumper reinforcement can be secured by the bracket to which the setting plate is coupled. Moreover, while the rear bumper reinforcement serves its original function of towing with a hook attached thereto, the difference in rigidity between the rear end of the rear-side part and the front end of the bracket acts as a breakage starter in a rear-end collision along with the fragile portion provided on the lower side of the rear end portion, thus facilitating breakage without hindering it.

In one embodiment of the present disclosure, the rear side frame is formed by a U-shaped member that is open at an upper side and an upper wall member that closes an upper part of the U-shaped member; the U-shaped member is shared by a front part and a rear part of the rear side frame; and the upper wall member is divided into a rear-side upper wall member having lower proof stress and a front-side upper wall member having higher proof stress.

In this configuration, the U-shaped member is shared by the front part and the rear part of the rear side frame, while the upper wall member is divided into the rear-side upper wall member and the front-side upper wall member. Thus, the proof stress of the rear side frame at the front part and the rear part is easy to set, and the rear side frame can be broken so as to increase the amount of load absorbed by the entire rear side frame in a longitudinal direction.

In one embodiment of the present disclosure, a lower end of the rear bumper beam extends to below a mounting position of the load absorbing part, and a cutout is formed in the rear bumper beam at a position at which the rear bumper beam overlaps the mounting position of the load absorbing part as seen from a vehicle rear side. The cutout is formed in this configuration, so that the rear bumper reinforcement, particularly the load absorbing part, is easy to mount.

The present disclosure has an advantageous effect of enhancing the performance of protecting a vehicle component disposed under a rear floor against a rear-end collision load.

BRIEF DESCRIPTION OF THE DRAWINGS

FIG. 5 is a rear view of a rear bumper reinforcement;
and
FIG. 6A to FIG. 6D are views illustrating how a rear side frame deforms in a rear-end collision.

DETAILED DESCRIPTION

To enhance the performance of protecting a vehicle component disposed under a rear floor against a rear-end collision load, the present disclosure provides a rear vehicle-body structure of a vehicle including a rear bumper reinforcement having a rear bumper beam extending in a vehicle width direction along a rear bumper and load absorbing parts extending from left and right ends of the rear bumper beam toward a vehicle front side, and rear side frames extending in a vehicle front-rear direction respectively along left and right side portions of a rear floor and coupled at rear ends to front ends of the load absorbing parts. Also, a vehicle component is disposed under the rear floor. In this structure, the vertical center of the rear bumper beam is located lower than the respective vertical center of each of the rear side frames.

Embodiment

Figure 1:
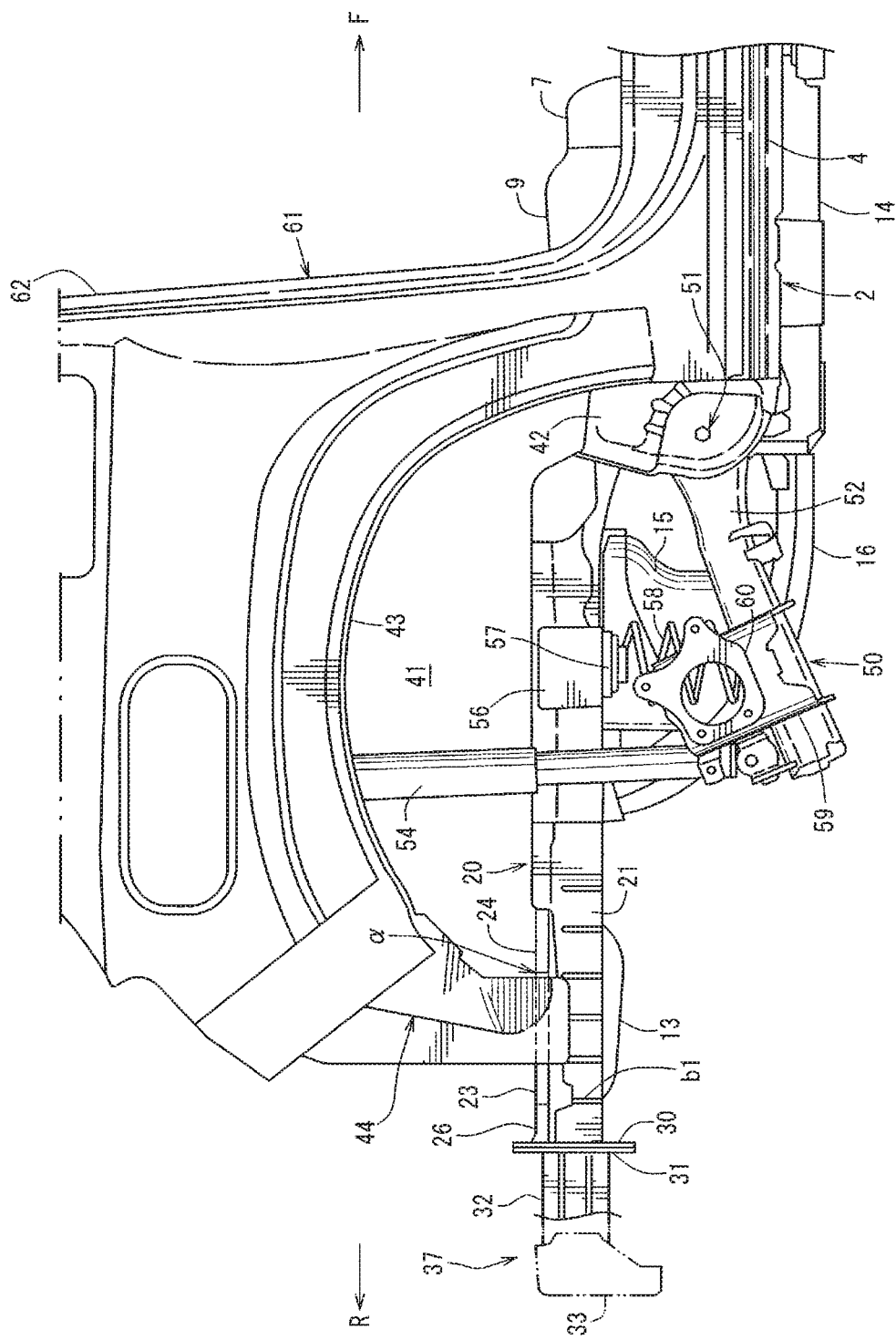
FIG. 1 is a side view of a vehicle right side showing a rear vehicle-body structure of a vehicle of the present disclosure.
Figure 2:
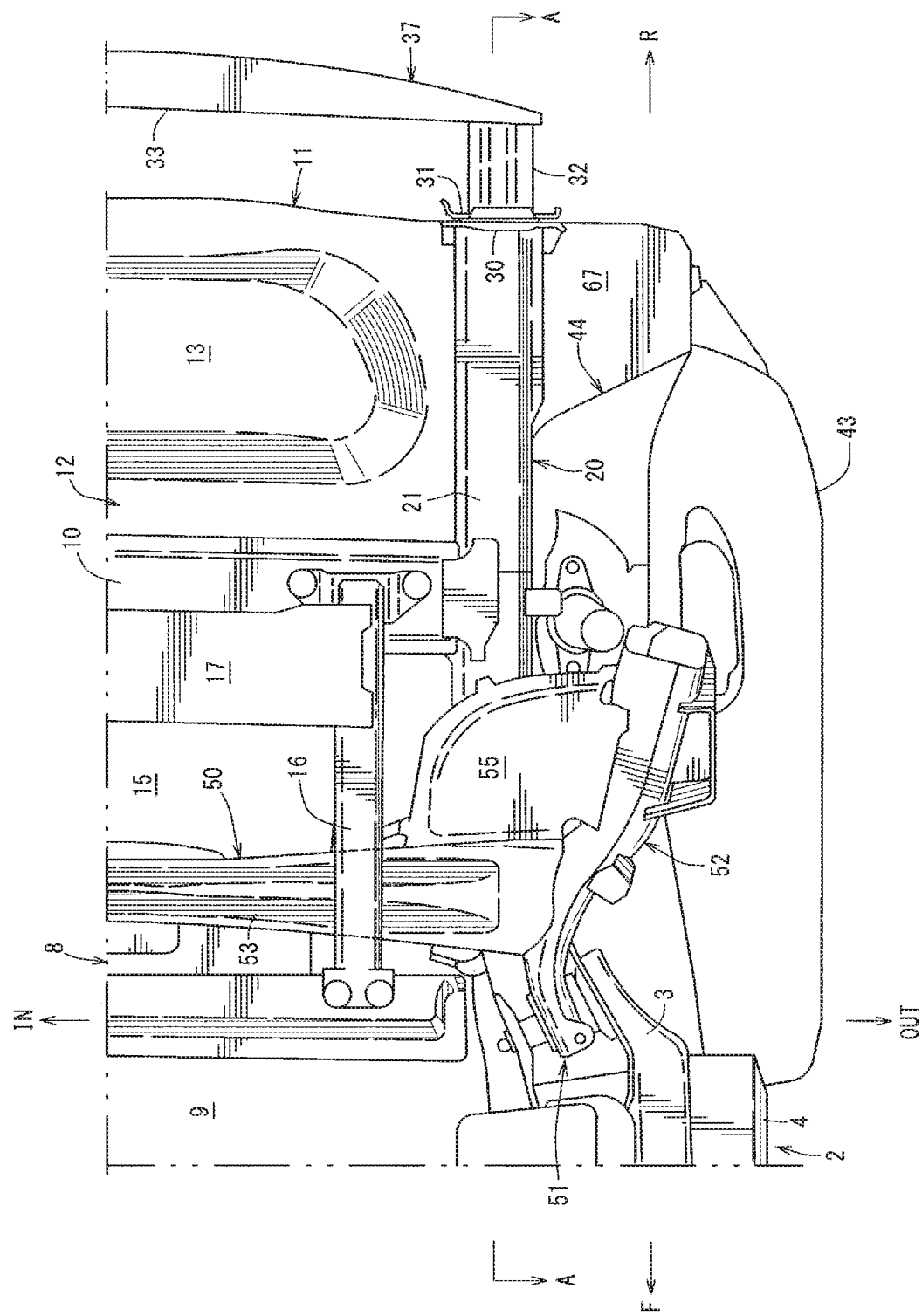
FIG. 2 is a bottom view of the vehicle right side of FIG. 1.
Figure 3:
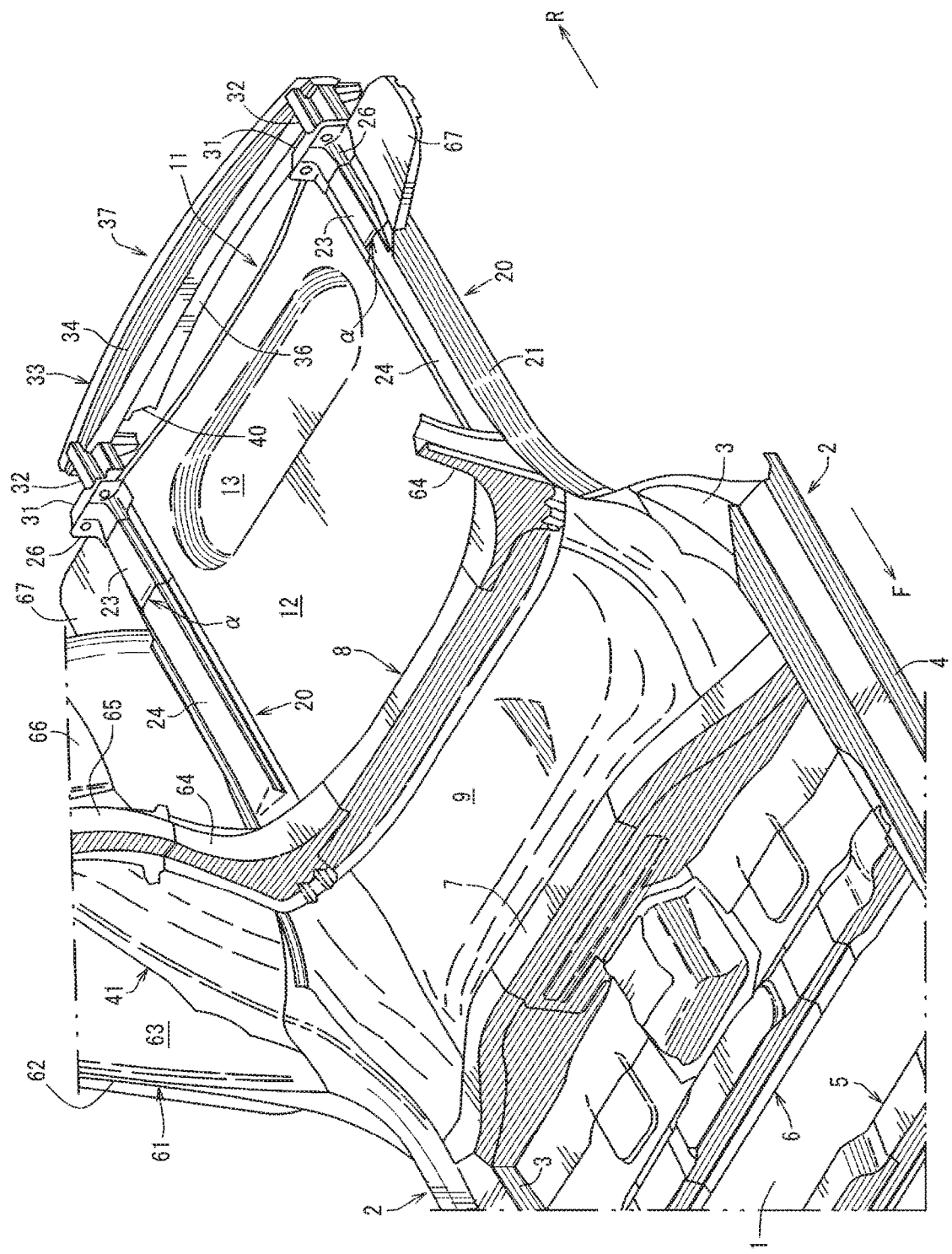
FIG. 3 is a perspective view showing the rear vehicle-body structure of the vehicle.
Figure 4:
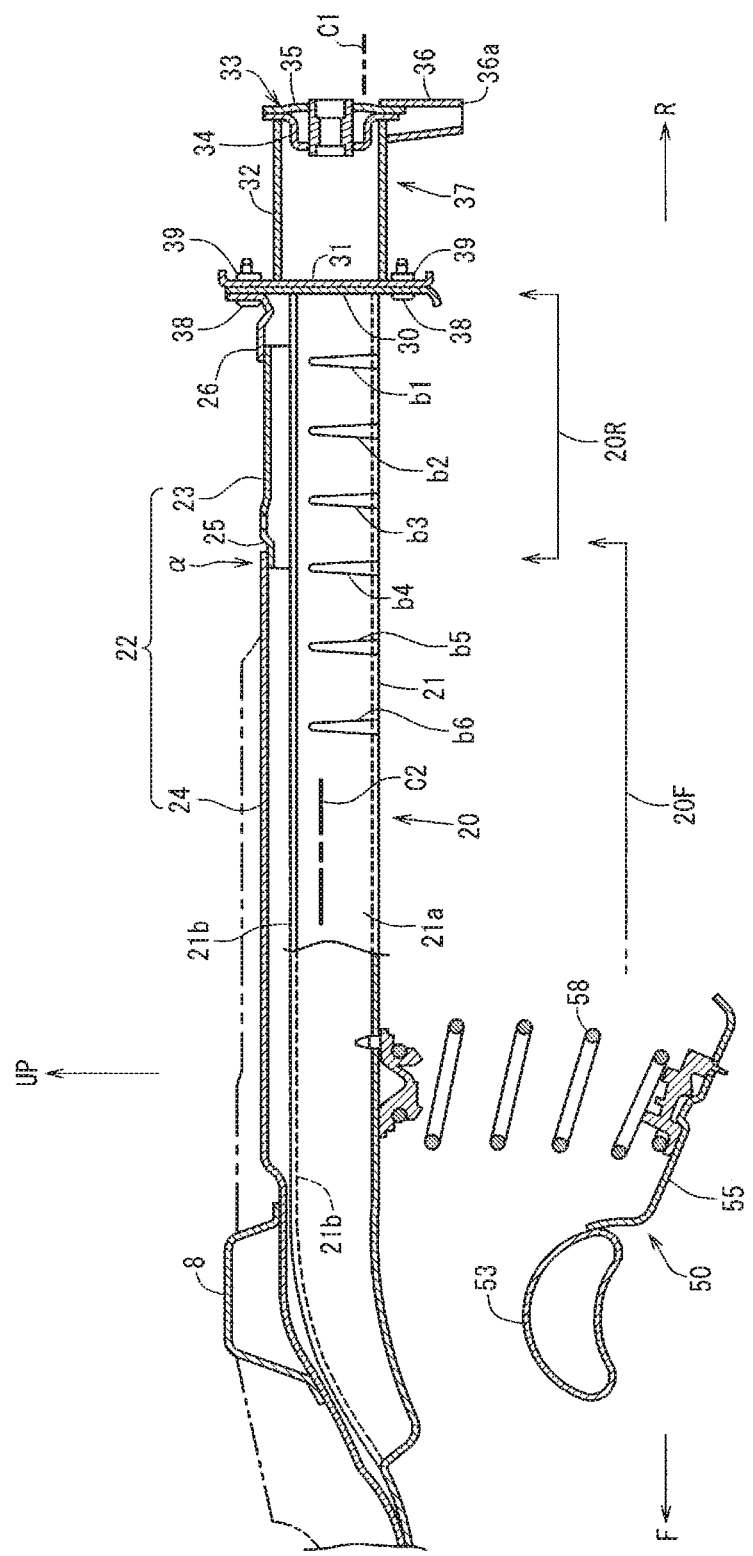
FIG. 4 is a sectional view taken along line A-A of FIG. 2.

One embodiment of the present disclosure will be described in detail below based on the drawings. The drawings show a rear vehicle-body structure of a vehicle. FIG. 1 is a side view of a vehicle right side showing the rear vehicle-body structure of the vehicle. FIG. 2 is a bottom view of the vehicle right side of FIG. 1. FIG. 3 is a perspective view showing the rear vehicle-body structure of the vehicle. FIG. 4 is a sectional view taken along line A-A of FIG. 2. FIG. 5 is a rear view of a rear bumper reinforcement.

In FIG. 3, a front floor panel 1 forming a floor of a vehicle interior is provided, and side sills 2 as vehicle body strengthening members extending in a vehicle front-rear direction are provided at left and right side portions in a vehicle width direction of the front floor panel 1. As shown in FIG. 2 and FIG. 3, each side sill 2 includes a side sill inner portion 3, a side sill reinforcement 4, and a side sill outer portion included in an outer panel of a vehicle body, and has a side sill closed cross-section extending in the vehicle front-rear direction.

As shown in FIG. 3, a front cross-member 5 (so-called No. 2 cross-member) extending in the vehicle width direction and coupling together the pair of left and right side sills 2, 2 is provided on an upper surface of the front floor panel 1 between the left and right side sills 2, 2, and a closed cross-section extending in the vehicle width direction is formed between the front cross-member 5 and the front floor panel 1.

As shown in FIG. 3, a middle cross-member 6 (so-called No. 2.5 cross-member) extending in the vehicle width direction and coupling together the left and right side sills 2, 2 is provided rearward of the front cross-member 5 so as to be parallel to the front cross-member 5. A closed cross-section extending in the vehicle width direction is formed between the middle cross-member 6 and the upper surface of the front floor panel 1.

As shown in FIG. 3, a kick-up 7 rising upward and then extending rearward is provided at a rear end portion of the front floor panel 1. A rear seat pan 9 above which a rear seat is installed is provided between the kick-up 7 shown in FIG. 1 and FIG. 3 and a rear cross-member 8 (so-called No. 4 cross-member) shown in FIG. 2 and FIG. 3. As shown in FIG. 2, a rear end cross-member 10 (so-called No. 4.5 cross-member) that extends in the vehicle width direction and couples together a pair of left and right rear side frames 20, 20 to be described later is provided further rearward of the rear cross-member 8.

The rear end cross-member 10 is provided parallel to the rear cross-member 8. A rear floor 12 is formed from the rear cross-member 8 to a rear end portion 11, and a trunk recess 13 protruding toward a vehicle lower side is formed at the center in the vehicle width direction of a rear portion of the rear floor 12. The vehicle in this embodiment is an electric vehicle. As shown in FIG. 1, a battery unit 14 that supplies electricity to a vehicle propulsion driving motor is disposed under the front floor panel 1 and the rear seat pan 9 located rearward of the kick-up 7.

As shown in FIG. 2, a fuel tank 15 is disposed under the rear floor 12, between the rear cross-member 8 (so-called No. 4 cross-member) and the rear end cross-member 10 (so-called No. 4.5 cross-member), and the fuel tank 15 is protected by a tank guard 16 extending in the vehicle front-rear direction and a tank guard 17 extending in the vehicle width direction, both serving as protectors.

As shown in FIG. 1, FIG. 2, and FIG. 3, the rear side frames 20 extending in the vehicle front-rear direction are joined and fixed to left and right side portions of the rear floor 12. As shown in FIG. 2 and FIG. 3, the rear side frames 20 are provided so as to extend from the rear end portion 11 toward a vehicle front side up to positions at which the rear side frames 20 overlap rear portions of the side sills 2. The rear cross-member 8 and the rear end cross-member 10 are provided across the pair of left and right rear side frames 20, 20.

As shown in FIG. 1, FIG. 2, and FIG. 4, a crash can 32 as a load absorbing part is mounted at a rear end of each rear side frame 20 through a setting plate 30 and a mounting plate 31, and a rear bumper beam 33 extending in the vehicle width direction is laterally suspended between the pair of left and right crash cans 32, 32.

As shown in FIG. 4 and FIG. 5, the rear bumper beam 33 includes a bumper beam main body 34 having a shape of a hat lying on its side in cross-section, a closing plate 35 that closes a rear open side of the bumper beam main body 34, and a lower extension portion 36 that is joined and fixed to the closing plate 35 and extends downward along the entire width of the closing plate 35 in the vehicle width direction.

The rear bumper beam 33 extends in the vehicle width direction along a rear bumper (not shown), and the rear bumper beam 33 and the crash cans 32, 32 as load absorbing parts extending from left and right ends of the rear bumper beam 33 toward the vehicle front side constitute a rear bumper reinforcement 37.

Here, the rear side frames 20 extend in the vehicle front-rear direction respectively along left and right side portions of the rear floor 12 and are coupled at rear ends to front ends of the crash cans 32, 32. As shown in FIG. 4, the setting plate 30 and the mounting plate 31 are fastened and fixed to each other with bolts 38 and nuts 39 at a total of four positions.

As shown in FIG. 4 and FIG. 5, a lower end 36a of the lower extension portion 36 extends to below the positions of the bolts 38 and the nuts 39 located on the vehicle-width-direction inner side and the lower side that are mounting positions of the crash cans 32. As shown in FIG. 5, cutouts 40 that are open at a lower side are formed in the lower extension portion 36, at positions at which the lower extension portion 36 overlaps the mounting positions of the crash cans 32 as load absorbing parts (the positions of the bolts 38 and the nuts 39 located on the vehicle-width-direction inner side and the lower side) as seen from the vehicle rear side. The cutouts 40 are formed so that the rear bumper reinforcement 37, particularly the crash cans 32, are easy to mount.

As shown in FIG. 1, FIG. 2, and FIG. 3, a rear wheel well 44 composed of a rear wheel well inner upper portion 41, a rear wheel well inner lower portion 42, and a rear wheel well outer portion 43 is provided on the vehicle-width-direction outer side of the rear side frame 20.

As shown in FIG. 1, FIG. 2, and FIG. 4, this vehicle includes a torsion-beam rear suspension 50 as a rear wheel suspension. As shown in FIG. 1, FIG. 2, and FIG. 4, the torsion-beam rear suspension 50 includes: trailing arms 52 having a hollow internal structure each extending from a front-end shaft support portion 51 toward a rear lower side; a torsion beam 53 having a hollow internal structure as a torsion bar spring that extends in the vehicle width direction and couples together the pair of left and right trailing arms 52, 52; a strut damper stay 54 (so-called rear damper) suspended under tension between upper portions of free ends of the trailing arms 52 and a body (see a damper support portion 66 to be described later); lower spring seats 55 each provided at a corner between the trailing arm 52 and the torsion beam 53; upper spring seats 57 each mounted on the rear side frame 20 through a bracket 56; and coil springs 58 as suspension springs each suspended under tension between the upper and lower spring seats 57, 55.

As shown in FIG. 1, a hub member 60 is mounted through a bracket 59 on a vehicle-width-direction outer side of the free end of each trailing arm 52, and the hub member 60 supports a rear wheel. On the other hand, as shown in FIG. 1, a center pillar-less door opening 62 is formed by the side sill 2 extending in the vehicle front-rear direction at a lower part, a quarter pillar 61 extending in a vehicle up-down direction at a rear part, a roof side rail extending in the vehicle front-rear direction at an upper part, a hinge pillar extending in the vehicle up-down direction at a front part, and a front pillar coupling together a front end of the roof side rail and an upper end of the hinge pillar in an oblique direction. The door opening 62 is configured to dispose therein a front door and a rear door forming a double door.

The following reference signs in FIG. 3 denote the following parts: 63 is side panel inner portions; 64 is lower brace members extending upward along the rear wheel well inner upper portions 41 from left and right side portions of the rear cross-member 8; 65 is upper brace members extending further upward along the rear wheel well inner upper portions 41 from the lower brace members 64; 66 is damper support portions; and 67 is floor side panels formed so as to protrude from rear portions of the rear side frames 20 outward in the vehicle width direction.

As shown in FIG. 4, the rear side frame 20 is composed of a rear side frame main body 21 having an inverted hat-shaped cross-section along the vehicle width direction and including a U-shaped portion that is open at an upper side, and an upper wall member 22 that closes an upper part of the inverted hat-shaped rear side frame main body 21.

The rear side frame main body 21 as a U-shaped member has an inverted hat shape formed by a U-shaped portion 21a and a flange 21b extending leftward and rightward in the vehicle width direction from an upper end of the U-shaped portion 21a. The upper wall member 22 has a hat-shaped cross-section of which the dimension in the up-down direction is smaller than that of the rear side frame main body 21. The rear floor 12 shown in FIG. 3 is interposed and fixed between a flange on the vehicle-width-direction inner side of the upper wall member 22 having a hat-shaped cross-section and the flange 21b on the vehicle-width-direction inner side of the rear side frame main body 21 having an inverted hat-shaped cross-section. Thus, the rear side frame main bodies 21 extend in the vehicle front-rear direction on lower sides of the left and right side portions of the rear floor 12, while the upper wall members 22 extend in the vehicle front-rear direction on upper sides of the left and right side portions of the rear floor 12.

The rear side frame main body 21 is shared by a front part and a rear part of the rear side frame 20, while the upper wall member 22 is divided into a rear-side upper wall member 23 having lower proof stress and a front-side upper wall member 24 having higher proof stress. Moreover, as shown in FIG. 4, the vertical center of the rear bumper beam 33 (see the vertical-center line C1) is located below the vertical center of the rear side frame 20 (see the vertical-center line C2).

Thus, even in a tall vehicle, such as an SUV, a rear-end collision load can be temporarily received by the rear bumper beam 33, so that the performance of protecting the fuel tank 15 (vehicle component) for a range-extended electric vehicle disposed under the rear floor 12 against a rear-end collision load is enhanced.

As shown in FIG. 4, the rear side frame 20 is divided into a rear-side part 20R composed of the rear-side upper wall member 23 and a rear-side portion of the rear side frame 20 facing the rear-side upper wall member 23, and a front-side part 20F composed of the front-side upper wall member 24 and a front-side portion of the rear side frame 20 facing the front-side upper wall member 24. The proof stress of the rear side frame 20 in an axial direction is set to be lower at the rear-side part 20R than at the front-side part 20F.

In this embodiment, the rear side frame main body 21, the rear-side upper wall member 23, and the front-side upper wall member 24 are all formed by high-tensile-strength rigid plates. The plate thickness of the front-side upper wall member 24 is set to be smaller than the plate thickness of the rear side frame main body 21, and the plate thickness of the rear-side upper wall member 23 is set to be even smaller than the plate thickness of the front-side upper wall member 24. High-tensile-strength rigid plates made of materials varying in proof stress are used such that the axial proof stress of the rear-side part 20R becomes lower than the axial proof stress of the front-side part 20F. Thus, in a rear-end collision of the vehicle, the load (energy) is absorbed as the rear side frame 20 bends at a rear end of the rear-side part 20R having lower axial proof stress and then a part of the rear side frame 20 on the front side from the rear end is axially compressed.

As shown in FIG. 4, a stepped portion 25 extending downward is formed as a fragile portion relative to a load applied in the front-rear direction, on the upper side of a border a between the front-side part 20F and the rear-side part 20R of the rear side frame 20, particularly on the upper side of a front end portion of the rear-side upper wall member 23. Thus, in a rear-end collision of the vehicle, the load is absorbed as the rear side frame 20 bends at the stepped portion 25 provided on the upper side of the border a and then a part of the rear side frame 20 on the front side from the stepped portion 25 is axially compressed.

As shown in FIG. 1, the border a is formed further rearward of the fuel tank 15, at a position corresponding to a middle position in the front-rear direction of the trunk recess 13 of the rear floor 12. As shown in FIG. 4, a bead b1 depressed into the closed cross-section of the rear side frame is formed as a fragile portion relative to a load applied in the front-rear direction, on the lower side of a rear end portion of the rear side frame 20, particularly on the lower side of a rear end portion of the rear side frame main body 21. As shown in FIG. 1 and FIG. 4, the bead b1 is formed on each of inner and outer sides of the U-shaped portion 21a. The bead b1 is formed such that the bead b1 acts as a breakage starter and facilitates breakage in a rear-end collision of the vehicle.

As shown in FIG. 4, in addition to the bead b1, a plurality of beads b2 to b6 depressed inward are formed in the rear side frame main body 21 at intervals in the vehicle front-rear direction, at positions corresponding to the rear-side part 20R and the front-side part 20F. The bead b4 of these beads b2 to b6 is formed at a position coinciding or substantially coinciding with the border a in the vehicle front-rear direction.

As shown in FIG. 3 and FIG. 4, a bracket 26 shaped to straddle an upper surface of the rear-side upper wall member 23 and a front surface of the setting plate 30 is provided on the upper side of the rear end of the rear-side part 20R of the rear side frame 20, particularly on the upper side of a rear end of the rear-side upper wall member 23. The rear end of the rear-side part 20R of the rear side frame 20 and a front end of the bracket 26 are different in rigidity from each other.

The bracket 26 couples the setting plate 30, and the bracket 26 is formed by a high-tensile-strength rigid plate having an even larger plate thickness than the rear side frame main body 21 that has the largest plate thickness of the rear-side upper wall member 23, the front-side upper wall member 24, and the rear side frame main body 21. The front end of the bracket 26 is set at the same position as the bead b1 provided as a fragile portion.

Thus, the supporting rigidity of the rear bumper reinforcement 37 is secured by the bracket 26 to which the setting plate 30 is coupled. Moreover, while the rear bumper reinforcement 37 serves its original function of towing with a hook (not shown) attached thereto, the difference in rigidity between the rear end of the rear-side part 20R and the front end of the bracket 26 acts as a breakage starter in a rear-end collision of the vehicle along with the bead b1 provided on the lower side of the rear end portion, thus facilitating breakage without hindering it.

FIG. 6A to FIG. 6D are views illustrating how the rear side frame 20 deforms in a rear-end collision of the vehicle. Starting from a normal state (non-collision state) shown in FIG. 6A, when a rear-end collision load is input into the rear bumper reinforcement 37, this rear-end collision load can be temporarily received by the rear bumper beam 33, as the vertical center of the rear bumper beam 33 is located below the vertical center of the rear side frame 20.

Thereafter, as shown in FIG. 6B, the crash can 32 is axially compressed to absorb the load. Moreover, the difference in rigidity between the front end of the bracket 26 and the rear end of the rear-side upper wall member 23 and the bead b1 as a fragile portion act as breakage starters, so that a part of the rear side frame 20 on the rear side from the bead b1 and a part thereof on the front side from the bead b1 deform into an inverted V-shape as shown in FIG. 6B and the load is thereby absorbed.

Next, as shown in FIG. 6C, the front-side part 20F and the rear-side part 20R deform into a V-shape centered at the stepped portion 25 as a fragile portion provided on the upper side of the border a between the front-side part 20F and the rear-side part 20R and at the portion at which the bead b4 is provided, and the load is thereby absorbed.

Next, as shown in FIG. 6D, the beads b2, b3, b4 are crushed to absorb the load (energy), so that the rear-side part 20R deforms into a V-shape to a greater degree. On the other hand, the front-side part 20F of the rear side frame 20 hardly deforms, so that the fuel tank 15 that is a vehicle component can be protected. The arrows F, R, IN, OUT, and UP in the drawings indicate the vehicle front side, the vehicle rear side, the vehicle-width-direction inner side, the vehicle-width-direction outer side, and the vehicle upper side, respectively.

As has been described above, the rear vehicle-body structure of a vehicle of the above embodiment includes the rear bumper reinforcement 37 having the rear bumper beam 33 extending in the vehicle width direction along the rear bumper and the load absorbing parts (crash cans 32) extending from the left and right ends of the rear bumper beam 33 toward the vehicle front side, and the rear side frames 20 extending in the vehicle front-rear direction respectively along the left and right side portions of the rear floor 12 and coupled at the rear ends to the front ends of the load absorbing parts (crash cans 32), with the vehicle component (fuel tank 15) disposed under the rear floor 12. In this structure, the vertical center of the rear bumper beam 33 (see the vertical-center line C1) is located below the vertical center of the rear side frame 20 (see the vertical-center line C2) (see FIG. 4).

In this configuration, the vertical center of the rear bumper beam 33 is located below the vertical center of the rear side frame 20, so that a rear-end collision load can be temporarily received by the rear bumper beam 33 even in a tall vehicle. Thus, the performance of protecting the vehicle component (fuel tank 15) disposed under the rear floor 12 against a rear-end collision load can be enhanced. In one embodiment of the present disclosure, the proof stress of the rear side frame 20 in the axial direction is set to be lower at the rear-side part 20R than at the front-side part 20F (see FIG. 4). In a rear-end collision, this configuration can absorb the load (energy) as the rear side frame 20 bends at the rear end of the rear-side part 20R having lower axial proof stress and then a part of the rear side frame 20 on the front side from the rear end is axially compressed.

In one embodiment of the present disclosure, a fragile portion (stepped portion 25) relative to a load applied in the front-rear direction is formed on the upper side of the border a between the front-side part 20F and the rear-side part 20R of the rear side frame 20 (see FIG. 4). In a rear-end collision, this configuration can absorb the load as the rear side frame 20 bends at the fragile portion (stepped portion 25) provided on the upper side of the border a and then a part of the rear side frame 20 on the front side from the fragile portion is axially compressed.

In one embodiment of the present disclosure, a fragile portion (bead b1) relative to a load applied in the front-rear direction is formed on the lower side of the rear end portion of the rear side frame 20 (see FIG. 4). In this configuration, the fragile portion (bead b1) is formed on the lower side of the rear end portion. This fragile portion (bead b1) acts as a breakage starter and can facilitate breakage in a rear-end collision.

In one embodiment of the present disclosure, the bracket 26 to which the setting plate 30 is coupled is provided on the upper side of the rear end of the rear-side part 20R of the rear side frame 20, and the rear end of the rear-side part 20R and the front end of the bracket 26 are different in rigidity from each other (see FIG. 4).

In this configuration, the supporting rigidity of the rear bumper reinforcement 37 can be secured by the bracket 26 to which the setting plate 30 is coupled. Moreover, while the rear bumper reinforcement 37 serves its original function of towing with a hook attached thereto, the difference in rigidity between the rear end of the rear-side part 20R and the front end of the bracket 26 acts as a breakage starter in a rear-end collision along with the fragile portion (bead b1) provided on the lower side of the rear end portion, thus facilitating breakage without hindering it.

In one embodiment of the present disclosure, the rear side frame 20 is formed by the U-shaped member (rear side frame main body 21) that is open at the upper side and the upper wall member 22 that closes the upper part of the U-shaped member (rear side frame main body 21); the U-shaped member (rear side frame main body 21) is shared by the front part and the rear part of the rear side frame 20; and the upper wall member 22 is divided into the rear-side upper wall member 23 having lower proof stress and the front-side upper wall member 24 having higher proof stress (see FIG. 4).

In this configuration, the U-shaped member (rear side frame main body 21) is shared by the front part and the rear part of the rear side frame 20, while the upper wall member 22 is divided into the rear-side upper wall member 23 and the front-side upper wall member 24. Thus, the proof stress of the rear side frame 20 at the front part and the rear part is easy to set, and the rear side frame 20 can be broken so as to increase the amount of load absorbed by the entire rear side frame 20 in a longitudinal direction.

In one embodiment of the present disclosure, the lower end of the rear bumper beam 33 extends to below the mounting positions of the load absorbing parts (crash cans 32), and the cutouts 40 are formed in the rear bumper beam 33 at the positions at which the rear bumper beam 33 overlaps the mounting positions of the load absorbing parts (crash cans 32) as seen from the vehicle rear side (see FIG. 4 and FIG. 5). The cutouts 40 are formed in this configuration, so that the rear bumper reinforcement 37, particularly the load absorbing parts (crash can 32), are easy to mount.

The components of the present disclosure and those of the above embodiment correspond to each other as follows. The load absorbing part of the present disclosure corresponds to the crash can 32 of the embodiment; the vehicle component corresponds to the fuel tank 15; the fragile portion of claim 3 corresponds to the stepped portion 25; the fragile portion of claim 4 corresponds to the bead b1; and the U-shaped member corresponds to the rear side frame main body 21. However, the components of the present disclosure are not limited to those of the above embodiment.

For example, instead of the stepped portion 25, a bead depressed downward may form a fragile portion. The number of the beads b1 to b6 to be formed and the interval between the beads shown in the above embodiment are not limited to those of the structure of the embodiment shown in the drawings.

As described above, the present disclosure is suitably applied to a rear vehicle-body structure of a vehicle including a rear bumper reinforcement having a rear bumper beam extending in a vehicle width direction along a rear bumper and load absorbing parts extending from left and right ends of the rear bumper beam toward a vehicle front side, and rear side frames extending in a vehicle front-rear direction respectively along left and right side portions of a rear floor and coupled at rear ends to front ends of the load absorbing parts, a vehicle component being disposed under the rear floor.

What is claimed is:

1. A rear vehicle-body structure of a vehicle comprising:
    a rear bumper reinforcement having a rear bumper beam extending in a vehicle width direction along a rear bumper and load absorbing parts extending from left and right ends of the rear bumper beam toward a vehicle front side;
    rear side frames extending in a vehicle front-rear direction respectively along left and right side portions of a rear floor and coupled at rear ends to front ends of the load absorbing parts, a vertical center of the rear bumper beam being located lower than a respective vertical center of each of the rear side frames; and
    a vehicle component disposed under the rear floor.

2. The rear vehicle-body structure of a vehicle according to claim 1, wherein
    proof stress of each of the rear side frames in an axial direction is set to be lower at a rear-side part than at a front-side part.

3. The rear vehicle-body structure of a vehicle according to claim 1, wherein
    a fragile portion relative to a load applied in a front-rear direction is formed on an upper side of a border between a front-side part and a rear-side part of the rear side frames.

4. The rear vehicle-body structure of a vehicle according to claim 2, wherein
    a fragile portion relative to a load applied in a front-rear direction is formed on a lower side of a rear end portion of the rear side frames.

5. The rear vehicle-body structure of a vehicle according to claim 3, wherein
    a fragile portion relative to a load applied in a front-rear direction is formed on a lower side of a rear end portion of the rear side frames.

6. The rear vehicle-body structure of a vehicle according to claim 4, wherein
    a bracket to which a setting plate is coupled is provided on an upper side of a rear end of a rear-side part of the rear side frames; and
    the rear end of the rear-side part and a front end of the bracket are different in rigidity from each other.

7. The rear vehicle-body structure of a vehicle according to claim 5, wherein
    a bracket to which a setting plate is coupled is provided on an upper side of a rear end of a rear-side part of the rear side frames; and
    the rear end of the rear-side part and a front end of the bracket are different in rigidity from each other.

8. The rear vehicle-body structure of a vehicle according to claim 2, wherein
each of the rear side frames is formed by a U-shaped member that is open at an upper side and an upper wall member that closes an upper part of the U-shaped member;
the U-shaped member is shared by a front part and a rear part of the each of the rear side frames; and
the upper wall member is divided into a rear-side upper wall member having lower proof stress and a front-side upper wall member having higher proof stress.

9. The rear vehicle-body structure of a vehicle according to claim 3, wherein
each of the rear side frames is formed by a U-shaped member that is open at an upper side and an upper wall member that closes an upper part of the U-shaped member;
the U-shaped member is shared by a front part and a rear part of the each of the rear side frames; and
the upper wall member is divided into a rear-side upper wall member having lower proof stress and a front-side upper wall member having higher proof stress.

10. The rear vehicle-body structure of a vehicle according to claim 4, wherein
each of the rear side frames is formed by a U-shaped member that is open at an upper side and an upper wall member that closes an upper part of the U-shaped member;
the U-shaped member is shared by a front part and a rear part of the each of the rear side frames; and
the upper wall member is divided into a rear-side upper wall member having lower proof stress and a front-side upper wall member having higher proof stress.

11. The rear vehicle-body structure of a vehicle according to claim 5, wherein
each of the rear side frames is formed by a U-shaped member that is open at an upper side and an upper wall member that closes an upper part of the U-shaped member;
the U-shaped member is shared by a front part and a rear part of the each of the rear side frames; and
the upper wall member is divided into a rear-side upper wall member having lower proof stress and a front-side upper wall member having higher proof stress.

12. The rear vehicle-body structure of a vehicle according to claim 6, wherein
each of the rear side frames is formed by a U-shaped member that is open at an upper side and an upper wall member that closes an upper part of the U-shaped member;
the U-shaped member is shared by a front part and a rear part of the each of the rear side frames; and
the upper wall member is divided into a rear-side upper wall member having lower proof stress and a front-side upper wall member having higher proof stress.

13. The rear vehicle-body structure of a vehicle according to claim 7, wherein
each of the rear side frames is formed by a U-shaped member that is open at an upper side and an upper wall member that closes an upper part of the U-shaped member;
the U-shaped member is shared by a front part and a rear part of the each of the rear side frames; and
the upper wall member is divided into a rear-side upper wall member having lower proof stress and a front-side upper wall member having higher proof stress.

14. The rear vehicle-body structure of a vehicle according to claim 1, wherein
a lower end of the rear bumper beam extends to below a mounting position of the load absorbing part, and a cutout is formed in the rear bumper beam at a position at which the rear bumper beam overlaps the mounting position of the load absorbing part as seen from a vehicle rear side.

15. The rear vehicle-body structure of a vehicle according to claim 2, wherein
a lower end of the rear bumper beam extends to below a mounting position of the load absorbing part, and a cutout is formed in the rear bumper beam at a position at which the rear bumper beam overlaps the mounting position of the load absorbing part as seen from a vehicle rear side.

16. The rear vehicle-body structure of a vehicle according to claim 3, wherein
a lower end of the rear bumper beam extends to below a mounting position of the load absorbing part, and a cutout is formed in the rear bumper beam at a position at which the rear bumper beam overlaps the mounting position of the load absorbing part as seen from a vehicle rear side.

17. The rear vehicle-body structure of a vehicle according to claim 4, wherein
a lower end of the rear bumper beam extends to below a mounting position of the load absorbing part, and a cutout is formed in the rear bumper beam at a position at which the rear bumper beam overlaps the mounting position of the load absorbing part as seen from a vehicle rear side.

18. The rear vehicle-body structure of a vehicle according to claim 6, wherein
a lower end of the rear bumper beam extends to below a mounting position of the load absorbing part, and a cutout is formed in the rear bumper beam at a position at which the rear bumper beam overlaps the mounting position of the load absorbing part as seen from a vehicle rear side.

19. The rear vehicle-body structure of a vehicle according to claim 8, wherein
a lower end of the rear bumper beam extends to below a mounting position of the load absorbing part, and a cutout is formed in the rear bumper beam at a position at which the rear bumper beam overlaps the mounting position of the load absorbing part as seen from a vehicle rear side.

20. The rear vehicle-body structure of a vehicle according to claim 13, wherein
a lower end of the rear bumper beam extends to below a mounting position of the load absorbing part, and a cutout is formed in the rear bumper beam at a position at which the rear bumper beam overlaps the mounting position of the load absorbing part as seen from a vehicle rear side.

* * * * *